(12) United States Patent
Huang et al.

(10) Patent No.: US 6,549,193 B1
(45) Date of Patent: *Apr. 15, 2003

(54) TOUCH PANEL WITH IMPROVED LINEAR RESPONSE AND MINIMAL BORDER WIDTH ELECTRODE PATTERN

(75) Inventors: Jianming Huang, Salem, NH (US); Bernard O. Geaghan, Salem, NH (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,391

(22) Filed: Oct. 9, 1998

(51) Int. Cl.[7] ................................................. G09G 5/00
(52) U.S. Cl. ..................................... 345/173; 178/18.05
(58) Field of Search .............................. 345/173, 174; 178/18

(56) References Cited

U.S. PATENT DOCUMENTS

| | | | |
|---|---|---|---|
| 2,711,983 A | 6/1955 | Hoyt | |
| 3,729,819 A | 5/1973 | Horie | |
| 3,798,370 A | 3/1974 | Hurst | |
| 4,198,539 A | 4/1980 | Pepper, Jr. | |
| 4,220,815 A | * 9/1980 | Gibson et al. | 178/18.05 |
| 4,293,734 A | 10/1981 | Pepper, Jr. | |
| 4,369,063 A | 1/1983 | McGowan, Jr. | |
| 4,371,746 A | * 2/1983 | Pepper, Jr. | 178/18.05 |
| 4,600,807 A | 7/1986 | Kable | |
| 4,661,655 A | * 4/1987 | Gibson et al. | 178/18.05 |
| 4,694,573 A | 9/1987 | Nishino et al. | |
| 4,697,885 A | 10/1987 | Minowa et al. | |
| 4,731,508 A | 3/1988 | Gibson et al. | |
| 4,822,957 A | 4/1989 | Talmage, Jr. et al. | |
| 4,846,869 A | 7/1989 | Palanisamy | |
| 5,041,701 A | 8/1991 | Wolfe et al. | |
| 5,045,644 A | 9/1991 | Dunthorn | |
| 5,346,651 A | 9/1994 | Oprosky et al. | |
| 5,815,141 A | * 9/1998 | Phares | 345/173 |
| 5,886,687 A | 3/1999 | Gibson | |
| 5,940,065 A | * 8/1999 | Babb et al. | 345/178 |

* cited by examiner

*Primary Examiner*—Richard Hjerpe
*Assistant Examiner*—Alexander Eisen
(74) *Attorney, Agent, or Firm*—Robert J. Peckman

(57) ABSTRACT

A touch screen panel including an insulative substrate; a resistive layer disposed on the insulative substrate; and a plurality of spaced conductive segments on the resistive layer along the border thereof. The conductive segments are disposed in rows, and every row has at least two segments which face at least a portion of three segments in the next inner row for optimizing the linearity of the touch screen panel and at the same time reducing the space occupied on the touch screen panel by the conductive segments.

18 Claims, 7 Drawing Sheets

US 6,549,193 B1

TOUCH PANEL WITH IMPROVED LINEAR RESPONSE AND MINIMAL BORDER WIDTH ELECTRODE PATTERN

FIELD OF INVENTION

This invention relates to touch screen sensors and in particular to the electrode pattern formed on the border of the resistive layer of the touch screen panel.

BACKGROUND OF INVENTION

Touch screen panels generally comprise an insulative (e.g. glass) substrate and resistive layer disposed on the insulative substrate. A pattern of conductive electrodes are then formed on the edges of the resistive layer. The conductive electrodes form orthogonal electric fields in the X and Y direction across the resistive layer. Contact of a finger or stylus on the panel then causes the generation of a signal that is representative of the x and y coordinates of the location of the finger or stylus with respect to the substrate. In this way, the associated touch panel circuitry can ascertain where the touch occurred on the substrate.

Typically, a computer program generates an option to the user (e.g. "press here for 'yes' and press here for 'no'") on a monitor underneath the touch screen panel and the conductive electrode pattern assists in detecting which option the user chose when the touch screen panel was touched by the user.

There have been numerous attempts to linearize the orthogonal fields across the resistive layer in order to locate the exact position of a touch on the touch screen and to increase the usable area of the touch screen.

In general, however, linearization efforts come at a cost: namely, the size of the electrode pattern, because linearization can be optimized by increasing the number of rows of electrode segments, or the complexity by producing the insulated segments in the electrode pattern. These efforts, in turn, increase the size, and in particular the width of the electrode pattern along the border of the touch screen panel thereby reducing the usable touch screen space, or increase the manufacturing complexity and cost.

Three major factors are used to evaluate the electrode configuration. The first and most obvious factor is the linear response. The second factor is the complexity in manufacturing these electrode patterns, which indicates the cost factor. The third factor is the width of the electrode patterns, which also indicates the cost factor. These electrodes can occupy considerable space along the edge of the touch sensor. Given today's display technology, the size of a display frame can be reduced to save space. Therefore, a larger electrode pattern will partially invade the display's viewable area, rendering the touch sensor unusable.

None of the prior art electrode pattern configurations satisfactorily resolve all three factors and must sacrifice either linearity, narrow width or simplicity.

See U.S. Pat. No. 4,822,957 and U.S. Pat. No. 4,371,746 incorporated herein by this reference. Both U.S. Pat. No. 4,822,957, which is currently used in Elo Touch's 5 wire resistive touch panel, and U.S. Pat. No. 4,371,746, which is currently used in MicroTouch's capacitive touch panel, exhibit considerable hooks of equipotential lines near the conductive segments. Furthermore, Elo's electrode pattern is composed of conductors and insulators which are produced in two separate processes.

The MicroTouch electrode pattern occupies a considerable amount of space.

SUMMARY OF INVENTION

It is therefore an object of this invention to provide a touch panel with an improved linear response and minimum border width edge electrode pattern.

It is a further object of this invention to provide such a touch panel at a low cost and using manufacturing techniques which result in a higher yield.

It is a further object of this invention to provide such a touch screen panel which is simple to manufacture and uses simpler electrode configurations.

This invention results from the realization that the linearity of a touch screen panel can be improved at the same time the size and especially the width of the electrode pattern is reduced not by complex electrode configurations but instead by a continuous repeating pattern of rows of spaced electrode conductive segments wherein every row including the outermost row has at least two conductive segments facing three conductive segments in the next adjacent inner row. In this way, the number of gaps is increased but each gap can be made smaller and the rows placed closer together resulting in improved linearity and a smaller size electrode pattern both of which increases the usable touch screen space.

A touch screen panel comprising an insulative substrate, a resistive layer on the insulative substrate, and a plurality of spaced conductive segments on the resistive layer along the border thereof, the conductive segments disposed in rows, every row having at least two segments each facing at least a portion of three segments in an adjacent row for improving the linearity of the touch screen panel and at the same time reducing the space occupied by the conductive segments on the touch screen panel.

Preferably, at least two segments of each row face each one complete segment and portions of two other segments in an adjacent row. Usually, a majority of the conductive segments in a row are of equal length.

There may be K total rows and $2^{(K-L+2)}+1$ segments in each row with L being the row number and L=1 denoting the innermost row on the panel. K should be at least two so that there are at least two rows.

In many embodiments, there is a center conductive segment which extends across the rows of conductive segments. Usually, there is a center segment on each side of the panel. Also, a back shield layer is usually disposed on the substrate opposite the resistive layer. A conductive electrode may be disposed circumferentially on the back shield layer.

For resistive touch screen panels, a flexible layer is spaced from the resistive layer, and a plurality of insulated spacer elements are disposed between the flexible layer and the resistive layer for maintaining separation between the flexible layer and the resistive layer.

A plurality of electrode leads are connected to different conductive segments to generate an electrical field across the resistive layer. In one embodiment, the electrical leads are wires. In another embodiment, the electrical leads are lands deposited on a dielectric layer disposed on the resistive layer.

DISCLOSURE OF PREFERRED EMBODIMENT

Other objects, features and advantages will occur to those skilled in the art from the following description of a preferred embodiment and the accompanying drawings, in which.

Figure 1:
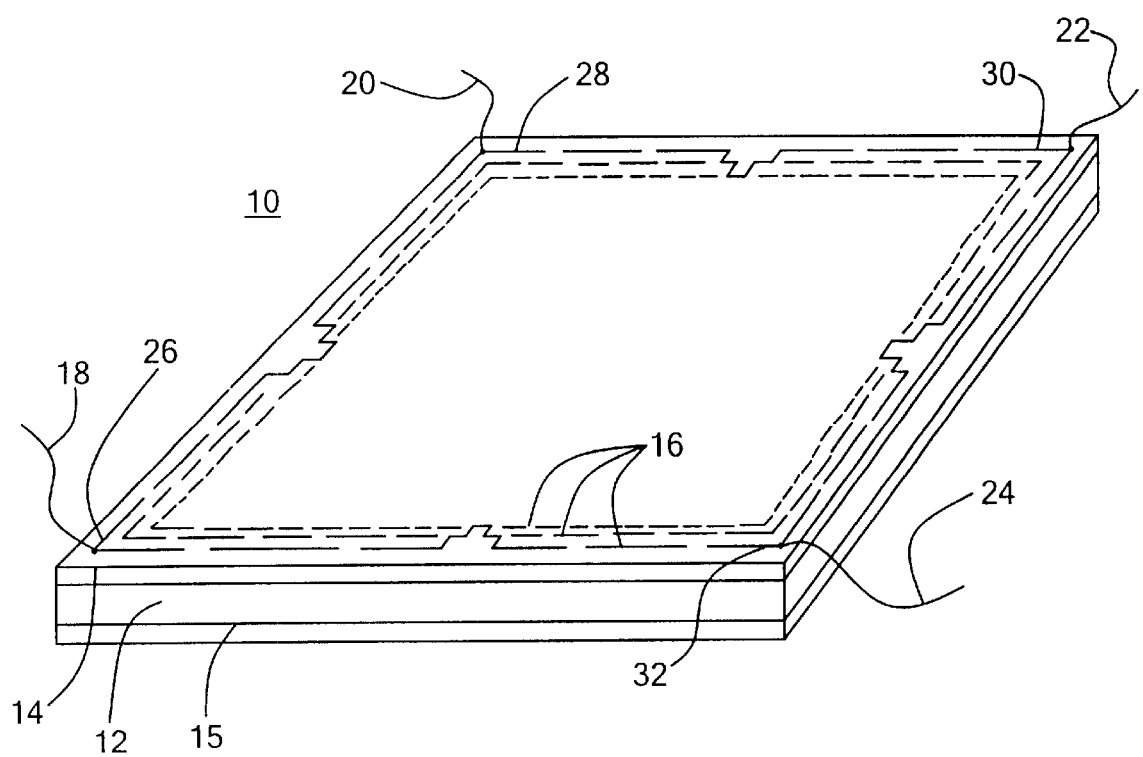
FIG. 1 is a schematic three-dimensional view of the touch screen panel in accordance with the subject invention.

Touch screen panel 10, FIG. 1, includes insulated substrate 12, for example, glass, and resistive layer 14 disposed thereon. Resistive layer 14 may be antimony tin oxide (ATO), as is known in the art and is actually very thin. Therefore, FIG. 1 is not to scale. On resistive layer 14 is a conductive silver ink or frit pattern forming a number of spaced conductive segments 16 on each edge of panel 10 as shown. Conductive segments 16 may be copper or aluminum foil deposited (screened or printed) on resistive layer 14, or formed by etching, vacuum deposit, and sputtering techniques. A protective dielectric layer (not shown) may optionally be deposited on resistive layer 14 by dipping or sputtering techniques.

Alternatively, conductive segments 16 may be deposited on substrate 12 and resistive layer 14 deposited over segments 16. For example, the pattern of conductive segments could be formed from copper or aluminum foil on a fiberglass substrate and the copper or aluminum etched away to leave the conductive segments in the pattern shown. The resistive layer can then be a polymer ink with conductive material incorporated therein or a paint pigmented with a resistive material.

At the four corners of the touch panel, wire leads 18, 20, 22, and 24 are connected to corner segments 26, 28, 30, and 32 as is known in the art. See U.S. Pat. No. 4,371,746, U.S. Pat. No. 4,198,539 and U.S. Pat. No. 4,293,734 incorporated herein by this reference.

Figure 2:
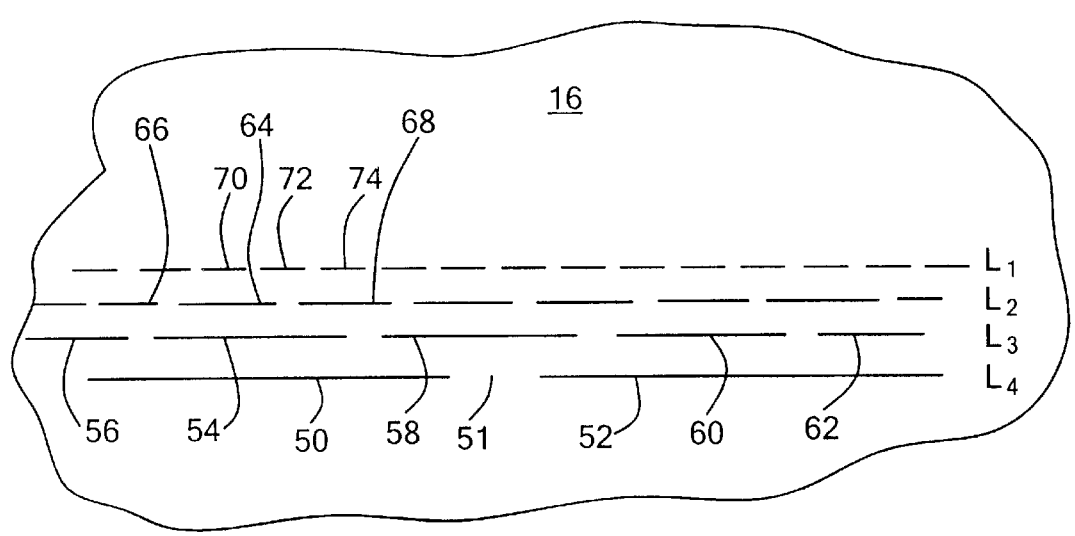
FIG. 2 is a schematic view of the unique electrode conductive segment pattern for the border areas of the touch screen panel shown in FIG. 1.

Unique in this invention is the pattern of conductive segments 16, a portion of which is shown in detail in FIG. 2. The conductive segments are disposed in rows $L_1$, and $L_2$, $L_3$, $L_4$. Row $L_4$ is the row proximate the edge of the touch panel or the outer most row; row $L_1$ is the inner most row. Preferably, the conductive segments in a given row are all the same length and odd in number and the length of the segments decrease as the rows progress away from the edge of the panel. Therefore, the equal length segments in row $L_4$ are the longest; the equal length segments in row $L_3$ are shorter than the segments of row $L_4$; the segments of row $L_2$ are shorter than the segments of row $L_3$; and the segments of row $L_1$ are shorter than the segments in row $L_2$ and therefore the shortest segments overall. In general, the shorter the segments in row $L_1$ can be made, the more linear the response of the panel.

Between each adjacent pair of space segments, there is a gap of resistive material such as gap 51 between segments 50 and 52 of row $L_4$.

Every row $L_1$, $L_2$, $L_3$, and $L_4$ contains at least two conductive segments each of which face at least a portion of three segments in the next inner adjacent row for linearizing the touch screen panel and at the same time reducing the space occupied by the conductive segments on the touch screen panel thereby rendering the distribution uniform. In one embodiment, on one edge of the panel, there were two conductive segments in row $L_4$ each facing three segments in row $L_3$. There were also corner electrodes and a center electrode in row $L_4$ discussed below. There were six conductive segments in row $L_3$ each facing three segments in row $L_2$ in addition to two segments in row $L_3$ on either side of the center electrode. In row $L_2$, there were 14 segments which each faced three segments in row $L_1$, and in addition two segments on either side of the center electrode. Row $L_1$, being the innermost row, had 32 conductive segments and one additional segment which was part of the center electrode. Since row $L_1$, was the innermost row, the segments of row $L_1$, did not face any other segments.

As shown in FIG. 2, outermost row $L_4$ has at least two conductive segments 50 and 52. Each of these segments face at least a portion of three segments in the next inner adjacent row $L_3$. For example, segment 50 of row $L_4$ faces complete segment 54 of row $L_3$ and portions of segments 56 and 58 of row $L_3$. Similarly, segment 52 of row $L_4$ faces all of segment 60 and portions of segments 58 and 62 of row $L_3$.

Segment 54 of row $L_3$, in turn, faces and overlaps all of segment 64 of row $L_2$ and parts of segments 66 and 68 of row $L_2$. The same is true for segments 58 and 60 of row $L_3$: they each face at least a portion of three segments in row $L_2$.

Finally, segment 64 of row $L_2$ faces at least a portion of three segments 70, 72 and 74 of row $L_1$. The same is true for segments 66 and 68 of row $L_2$ in that they each face at least a portion of three segments in row $L_1$.

The result is the ability to maximize the number of rows of conductive segments and yet minimize the size of the conductive segments in innermost row $L_1$ and at the same time minimize the space the rows of conductive segments take up on the edges of the touch screen panel to thereby increase the usable touch screen space and also to improve the linear response of the panel which ensures first that a uniform voltage gradient is produced when voltage is applied from one side of the panel to the opposite side of the panel via wires 18, 20, 22, and 24, FIG. 1 for resistive touch panels and second that a uniform current density is produced throughout resistive layer 14 for capacitive touch screen panel configurations.

Figure 3:
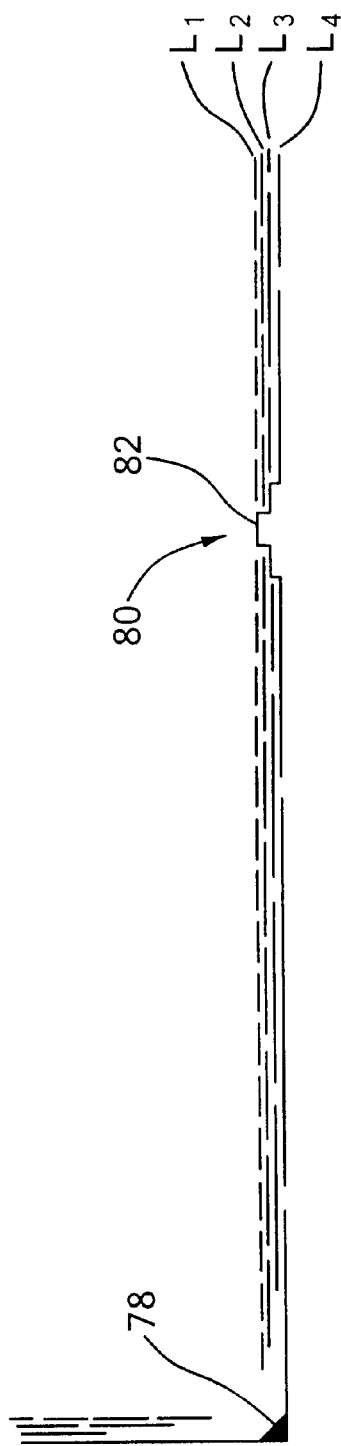
FIG. 3 is top view of a portion of the electrode pattern on the border area of the touch screen shown in FIG. 1.

There should be at least two rows of conductive segments but by increasing the number of rows, the segments in innermost row $L_1$ can be made shorter thereby reducing the hook or bending effect of equal potential lines in the border edge area proximate the conductive segments. The tradeoff is that more rows of conductive segments will increase the width of the electrode pattern and therefore reduce the usable area on the touch screen. In the subject invention, the total width of the four rows is 0.12 inches. In prior art devices, the total width of four rows was nearly 0.3 inches. In the subject invention, there was less than one percent bending of the lines of equal potential at the border area using four rows of conductive segments as shown in FIGS. 2 and 3. In the prior art device where four rows of conductive segments were used, the bending was much more severe reducing the usable space of the touch screen panel. Therefore, the unique arrangement of the rows of conductive segments in accordance with the subject invention as shown in FIGS. 2 and 3 reduces the width of the electrode pattern at the border areas of the touch screen panel and at the same time reduces the bending or hooking effect of the lines of equal potential thus greatly increasing the usable touch screen area.

Also, in the electrode pattern geometry shown in FIG. 2, the ends of at least a majority of the conductive segments in a given row are bridged by the segments in the row below it for even distribution of the voltage. For example, the ends of segment 70 in row $L_1$ are bridged by segments 66 and 64 of row $L_2$ and the ends of segment 72 are bridged by segment 64. Similarly, the ends of segment 66 in row $L_2$ are bridged by segments 56 and 54 in row $L_3$ and the ends of segment 64 in row $L_2$ are bridged by segment 54 in row $L_3$. The ends of segment 58 in row $L_3$, in turn, are bridged by segments 50 and 52 of row $L_4$ and the ends of segment 54 in row $L_3$ are bridged by segment 50 of row $L_4$.

In one embodiment, the pattern of FIG. 2 repeats along all four sides of panel 10, FIG. 1 in a symmetrical pattern such that the segments on one side of the panel align with the segments on the opposite side of the panel. If the touch screen is rectangular and 5.6 inches to 30 inches diagonal, four rows of conductive segments are typically used. In a prototype example, for a 14 inch diagonal square panel, the width of rows $L_1$ and $L_2$ was 0.015 inches, and the width of rows $L_3$ and $L_4$ was 0.02 inches. The spacing between rows $L_1$ and $L_2$ and between rows $L_2$ and $L_3$ was 0.015 inches. The spacing between rows $L_3$ and $L_4$ was 0.02 inches. The 33 segments of row $L_1$ were 0.09 inches long; the 17 segments of row $L_2$ were 0.47 inches long; the 9 segments of row $L_3$ were 0.91 inches long; and the 5 segments of row $L_4$ were 1.91 inches long. The gaps between adjacent segments varied between 0.015 and 0.020 inches.

In general, the following mathematical equation may be used to ascertain the optimal number of segments in each row:

$$2^{(k-1+2)}+1 \tag{1}$$

where K is the total number of rows and L equals 1 for the innermost row, L equals 2 for the row under that, and L equals K for the outermost row closest to the edge of the panel.

Preferably, each row has an odd number of conductive segments in it and there are at least two conductive segments in the outer row facing at least three conductive segments in the next inner row. In some embodiments, the panel may not be rectangular and equation (1) will therefore not suffice but still the idea of overlapping all the gaps in each with row conductive segments of all the other rows of segments above the gap will optimize the linear response of the panel and minimize the width of the rows thus optimizing the usable space on the touch panel.

In all embodiments, the length of the segments at the innermost row are minimized to reduce the hook in the usable area. If prior art electrode patterns are simply made smaller, the proper side to side resistance will not be maintained. Therefore, in the subject invention, the number of gaps of resistive material is increased in the proper proportion with respect to the decrease in the spacing between the rows to maintain the proper side to side resistance (e.g. from corner 26, FIG. 1 to corner 32).

Typically, the corner segments 26, 28, 30, and 32 are screen printed or otherwise formed as a single conductive segment as shown in FIG. 3 at 78.

In one embodiment, a center conductive segment 80, FIG. 3 on each side of the panel is fabricated in order to reduce the amount of conductive material and since the resistance of the conductive segment is essentially zero for the length of conductive material involved. Central conductive segment 80 includes conductive segment 82 of innermost row $L_1$ that is connected to a conductive segment in each succeeding row in a step wise fashion as shown. See U.S. Pat. No. 4,371,746.

Figure 4:
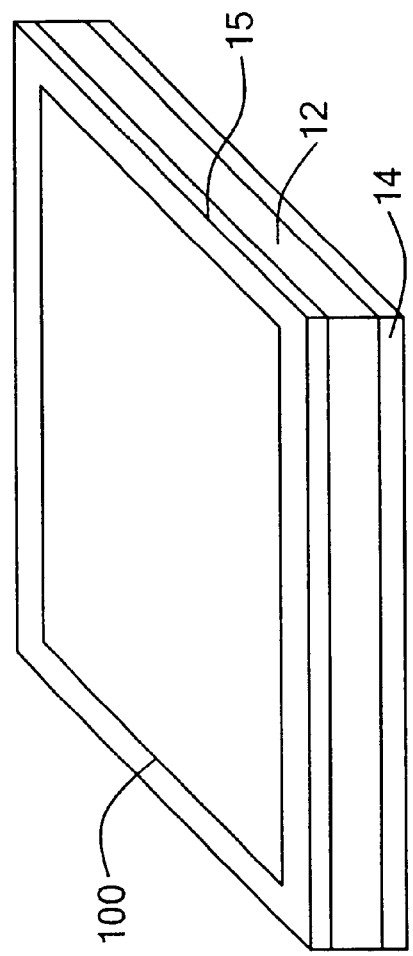
FIG. 4 is a schematic three-dimensional view of the bottom of the touch screen panel shown in FIG. 1.

In another embodiment, layer 15, of indium tin oxide FIGS. 1 and 4, is deposited on the bottom of panel 10 to provide a ground shield. As shown in FIG. 4, a conductive electrode is also disposed peripherally on bottom layer 15 proximate the edges thereof.

Figure 5:
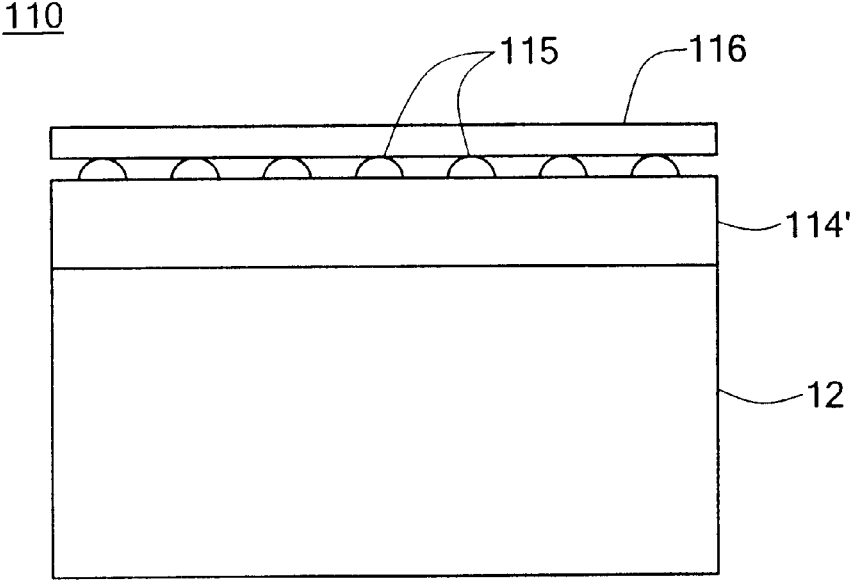
FIG. 5 is cross-sectional view of an embodiment of a resistive touch screen panel in accordance with the subject invention.

So far, the discussion has centered around capacitive touch screen panels. In another embodiment, resistive touch panel 110, FIG. 5, is formed by adding flexible layer 116 spaced from dielectric resistive layer 114' (e.g. indium tin oxide) via spacer dots 115 as is known in the art. See, for example, U.S. Pat. No. 3,798,370 incorporated herein by this reference. In this embodiment, the conductive segment pattern on resistive layer 114' is as shown in FIGS. 2 and 3.

Figure 6:
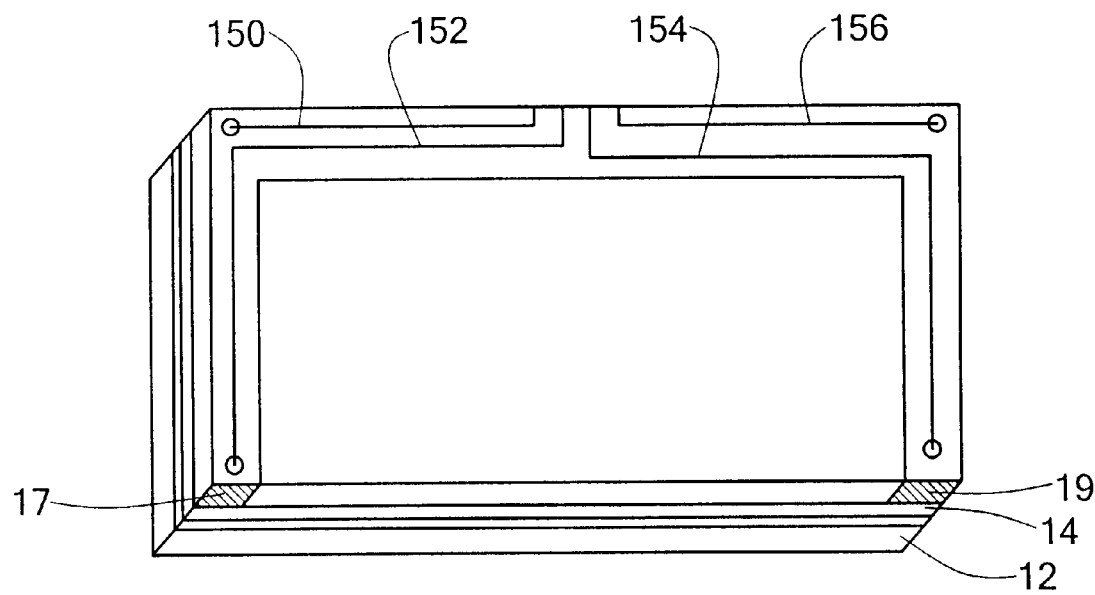
FIG. 6 is a schematic top view of one embodiment of the subject invention wherein conductive leads are deposited on a dielectric layer disposed over the resistive layer of the touch screen panel in accordance with the subject invention.

In still another embodiment, wires 18, 20, 22, and 24, FIG. 1 are replaced with conductive lands 150, 152, 154, and 156, FIG. 6 deposited circumferentially on thicker window shaped protective dielectric layer 19 as shown or in any other pattern desired in order to apply the appropriate voltage to the corner conductive segments on resistive layer 14 of the touch panel. Dielectric layers 19 and 17 are removed in the corner areas where the lands are connected to the corner conductive segments. Dielectric layer 17 is very thin and thus a thicker dielectric layer in a window configuration is placed on the periphery of the panel to lie under lands 150, 152, 154, 156.

A touch screen panel manufactured in accordance with the examples described above was compared to prior art touch screens. The electrode pattern discussed above produced uniform potential fields with less than 1 percent bending of the potential fields proximate the innermost row of the conductive segments as shown at 200, FIG. 7 for one corner of the panel when 10 volts is applied to corner electrodes 26, 58 and zero volts is applied to the opposite corner electrodes 30, 32, FIG. 1.

Figure 8:
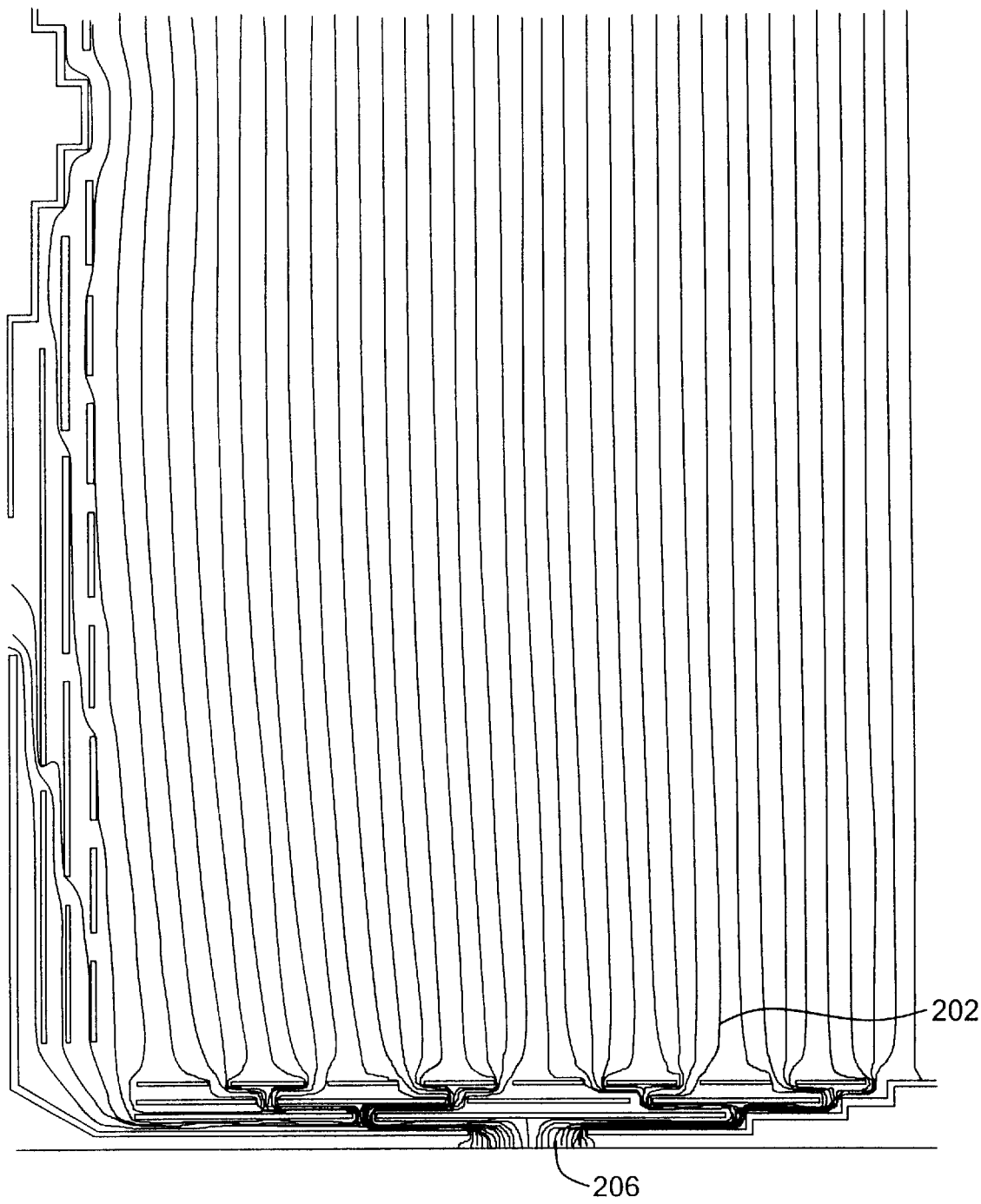
FIG. 8 is a schematic view similar to FIG. 7 for a prior art touch screen panel showing the undesirable bending which occurs due to a prior art electrode pattern configuration.

In contrast, the prior art touch screen shown in FIG. 8 where the electrode edge pattern was as described in U.S. Pat. No. 4,371,746, severe potential field bending occurred as shown at 202. Also, the edge pattern of this prior art touch screen occupies an inordinate amount of space on the touch screen. Simply reducing the spacing between adjacent rows of conductive segments, on the other hand, would impermissibly reduce the side to side resistance of the touch screen panel which would effect measurement accuracy. In the subject invention, in contrast, the number of gaps between adjacent conductive segments is increased to maintain the proper side to side resistance even though the spacing between the rows is decreased to thus increase the usable space on the touch screen panel.

Figure 9:
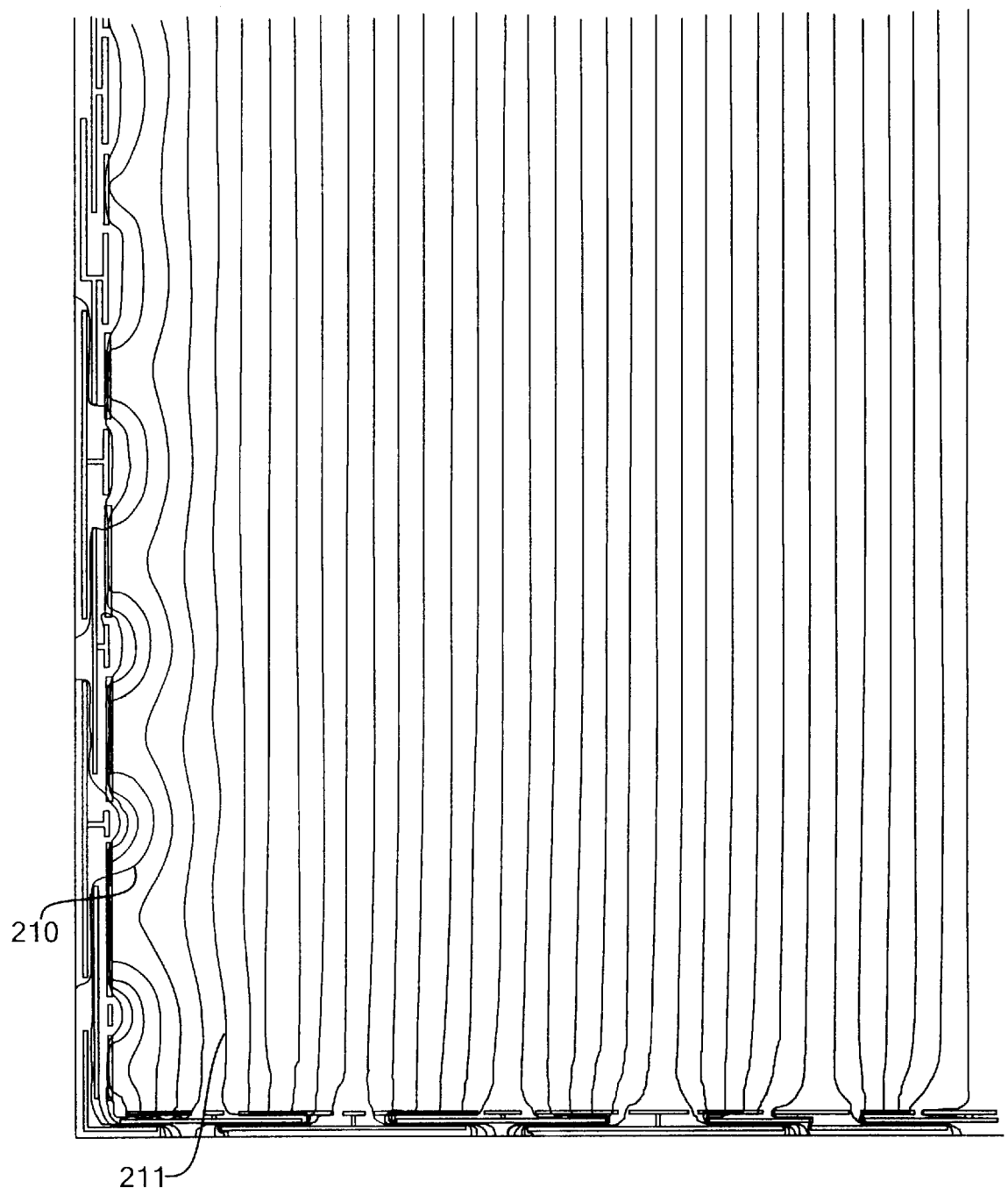
FIG. 9 is a view similar to FIG. 7 also showing the undesirable bending of the lines of equal potential due to a different prior art electrode structure configuration.

In the prior art pattern shown in FIG. 9, bending of the potential field is especially severe as shown at 210 rendering space 211 unusable. And, the pattern shown in FIG. 9 is difficult and costly to manufacture and still occupies an inordinate amount of space on the touch screen panel.

Therefore, in the subject invention, the electrode edge pattern reduces the bending of the equal potential lines to increase the usable linear area of the sensor and at the same time further increases the overall usable area of the sensor by substantially reducing the width of the edge pattern.

The side to side resistance of the edge pattern is dominated by the length of the partially overlapped conductive segments between the outermost row and the next row. This, in turn, allows the scale of the pattern to be expanded or contracted to accommodate any size surface without changing the total width of the pattern and without effecting linearization. Furthermore, the unique electrode pattern of this invention is easy and cost effective to manufacture because the edge pattern comprises only conductive segments and does not require selective deletion of the transparent resistive layer.

Figure 10:
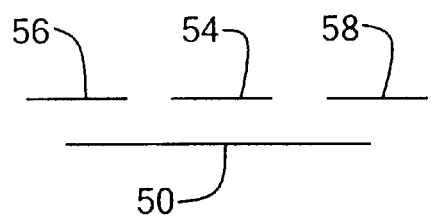
FIG. 10 is a schematic view of one portion of the electrode pattern shown in FIG. 2.
Figure 11:
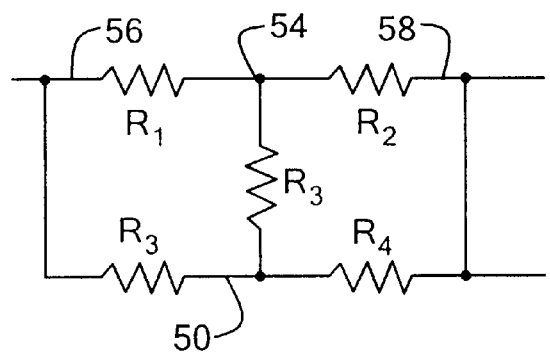
FIG. 11 is an electrical circuit representing the electrode pattern shown in FIG. 10.
Figure 12:
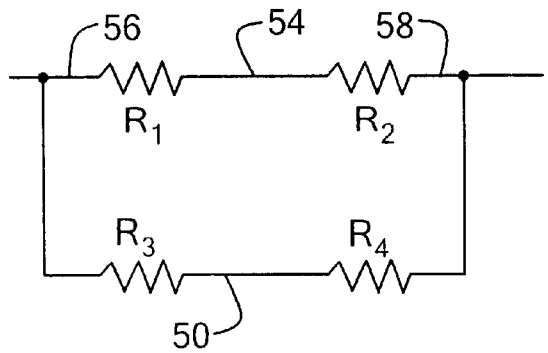
FIG. 12 is an electrical circuit of a circuit equivalent to the circuit of FIG. 11.

Electrically, wherein there are at least two conductive segments at the outer row $L_4$ each facing three conductive segments in the next inner row 15, FIG. 2, the edge pattern of this invention behaves as shown in FIGS. 10–12 where conductive segment 50 faces three conductive segments 56, and 54, and 58. In FIG. 11, $R_1=R_2$, the resistance of the gaps between segments 56 and 54, and the resistance of the gaps between segments 54 and 58, respectively; and $R_3=R_4$, the resistance of the gaps between segments 50 and its adjacent segments in the same row.

Figure 7:
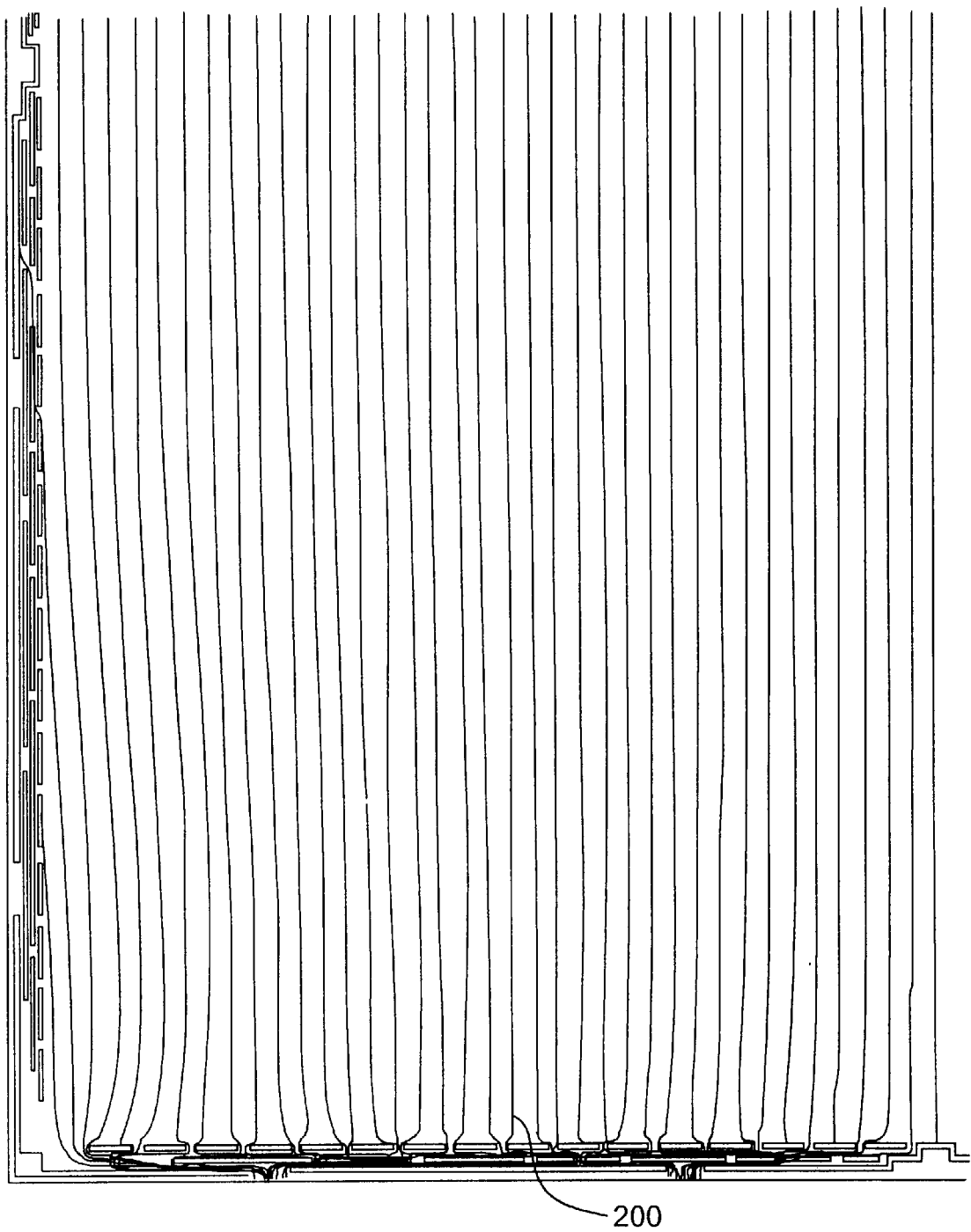
FIG. 7 is a schematic view of one corner of the lines of equal potential across the touch screen panel for one quarter of the touch screen panel in accordance with the subject invention.

The circuit shown in FIG. 11a is equivalent to the circuit shown in FIG. 12 due to the bridging effect. If a voltage field is applied to conductive segments 56 and 54, conductive segments 54 and 50 will receive half of that voltage. Therefore, this structure provides a uniform voltage distribution which generates the linear potential field as shown in FIG. 7.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A touch screen panel comprising
   an insulative substrate;
   a resistive layer on the insulative substrate; and
   a plurality of spaced conductive segments on the resistive layer along the border thereof, the conductive segments disposed in rows, every row having at least two segments each facing at least a portion of three segments in an adjacent row for improving the linearity of the touch screen panel and at the same time reducing the space occupied by the conductive segments on the touch screen panel.

2. The touch screen panel of claim 1 wherein at least two segments of each row face each one complete segment and portions of two segments in an adjacent row.

3. The touch screen panel of claim 1 in which a majority of the conductive segments in a row are of equal length.

4. The touch screen panel of claim 1 wherein there are k total rows and $2^{(k-L+2)}+1$ segments in each row with L being the row number and L=1 denoting the innermost row.

5. The touch screen panel of claim 4 in which k is at least 2.

6. The touch screen panel of claim 1 further including a center conductive segment which extends across the rows of conductive segments.

7. The touch screen panel of claim 1 further including a back shield layer disposed on the insulated substrate opposite the resistive layer.

8. The touch screen panel of claim 7 further including a conductive electrode disposed peripherally on the back shield layer.

9. The touch screen panel of claim 1 further including a dielectric layer disposed on the resistive layer.

10. The touch screen panel of claim 1 further including a flexible layer spaced from the resistive layer.

11. The touch screen panel of claim 10 further including a plurality of insulated spacer elements disposed between the flexible layer and the resistive layer for maintaining separation between the flexible layer and the resistive layer.

12. The touch screen panel of claim 1 further including a plurality of electrode leads connected to different conductive segments to generate an electrical field across the resistive layer.

13. The touch screen panel of claim 12 in which the electrical leads are wires.

14. The touch screen panel of claim 12 further including a dielectric layer disposed on the resistive layer and the electrical leads are lands deposited on the dielectric layer.

15. The touchscreen panel of claim 1 wherein each of the conductive segments within a row are the same length.

16. A touch screen panel comprising:
    an insulative substrate;
    a resistive layer on the insulative substrate; and
    a plurality of spaced conductive segments on the resistive layer along the border thereof, the conductive segments disposed in rows including an outer most row with two corner segments, at least one center conductive segment and at least two conductive segments one each between a corner segment and the center conductive segment for improving the linearity of the touch screen panel and at the same time reducing the space occupied by the conductive segments on the touch screen panel.

17. A touch screen panel comprising:
    an insulative substrate;
    a resistive layer on the insulative substrate; and
    a plurality of spaced conductive segments on the resistive layer along the border thereof, the conductive segments disposed in rows, every row having at least two segments each facing at least a portion of three segments in an adjacent row and a gap between each of the conductive segments in each row, the number of gaps increasing and the size of the gaps decreasing from an outer most row to an inner most row of the touch screen panel for improving the linearity of the touch screen panel and at the same time reducing the space occupied by the conductive segments on the touch screen panel.

18. A touch screen panel comprising:
    an insulative substrate;
    a resistive layer on the insulative substrate; and
    a plurality of spaced conductive segments on the resistive layer along the border thereof, the conductive segments disposed in rows including an outer most row with two corner segments, at least one center conductive segment and at least two conductive segments one each between a comer segment and the center conductive segment, every row having at least two segments facing at least a portion of three segments in an adjacent row for improving the linearity of the touch screen panel and at the same time reducing the space occupied by the conductive segments on the touch screen panel.

* * * * *